United States Patent
Wieck et al.

(10) Patent No.: US 6,998,816 B2
(45) Date of Patent: Feb. 14, 2006

(54) SYSTEM AND METHOD FOR REDUCING EXTERNAL BATTERY CAPACITY REQUIREMENT FOR A WIRELESS CARD

(75) Inventors: Christopher Peter Wieck, San Diego, CA (US); Graham Anthony Clift, Poway, CA (US)

(73) Assignee: Sony Electronics Inc., Park Ridge, NJ (US)

( * ) Notice: Subject to any disclaimer, the term of this patent is extended or adjusted under 35 U.S.C. 154(b) by 398 days.

(21) Appl. No.: 10/610,779

(22) Filed: Jun. 30, 2003

(65) Prior Publication Data

US 2004/0263124 A1 Dec. 30, 2004

(51) Int. Cl.
*H01M 10/44* (2006.01)
*H01M 10/46* (2006.01)

(52) U.S. Cl. ................................... 320/107
(58) Field of Classification Search ............... 320/107, 320/110, 112, 114, 115, 137, 138
See application file for complete search history.

(56) References Cited

U.S. PATENT DOCUMENTS

| | | | |
|---|---|---|---|
| 3,696,286 A * | 10/1972 | Ule | 320/101 |
| 5,451,933 A | 9/1995 | Stricklin et al. | 340/825.06 |
| 5,463,261 A | 10/1995 | Skarda et al. | 307/131 |
| 5,802,379 A | 9/1998 | Boatwright et al. | 395/750.06 |
| 5,818,207 A | 10/1998 | Hwang | 323/288 |
| 5,870,615 A | 2/1999 | Bar-On et al. | 395/750.02 |
| 5,914,585 A | 6/1999 | Grabon | 320/125 |
| 5,914,980 A | 6/1999 | Yokota et al. | 375/200 |
| 5,946,202 A | 8/1999 | Balogh | 363/26 |
| 5,973,475 A | 10/1999 | Combaluzier | 320/107 |
| 6,157,173 A | 12/2000 | Baranowski et al. | 320/152 |
| 6,292,863 B1 | 9/2001 | Terasaki et al. | 710/129 |
| 6,327,154 B1 | 12/2001 | Gauld et al. | 361/737 |
| 6,580,258 B1 | 6/2003 | Wilcox et al. | 323/282 |
| 2001/0033963 A1 | 10/2001 | Yamazaki et al. | 429/162 |
| 2002/0083239 A1 | 6/2002 | Lida et al. | 710/74 |
| 2002/0100809 A1 | 8/2002 | Lu | 235/492 |
| 2002/0121548 A1 | 9/2002 | Lu | 235/440 |
| 2002/0180277 A1 | 12/2002 | Acharya et al. | 307/140 |
| 2003/0094924 A1 | 5/2003 | Oh | 320/128 |

* cited by examiner

*Primary Examiner*—Edward H. Tso
(74) *Attorney, Agent, or Firm*—John L. Rogitz

(57) ABSTRACT

A system for providing power to a wireless card includes power interface that provides power to a compact flash card. A boost regulator boosts the power from the power interface. A battery provides power that is summed with the power from the power interface. Moreover, a buck regulator limits the voltage of the summed power. A compact flash card can be powered by the power interface while a wireless card can be powered by the summed power.

22 Claims, 2 Drawing Sheets

SYSTEM AND METHOD FOR REDUCING EXTERNAL BATTERY CAPACITY REQUIREMENT FOR A WIRELESS CARD

FIELD OF THE INVENTION

The present invention relates generally to power supply systems for wireless cards.

BACKGROUND OF THE INVENTION

Compact flash cards (CF cards) are size compatible with the current state of the art in wireless cards. Present technology allows integration in form factors much smaller than the previous generation of PCMCIA cards. However, few compact flash cards have been introduced to the market that are designed to work over Wireless Wide Area Networks (WWAN). One of the main reasons is that the CF interface is specified to allow only 500 mA maximum current to be drawn across a power interface and CDMA, for example, requires up to 850 mA. Thus, a wireless card cannot operate on the same power interface as the CF card.

It is possible to utilize an external battery to provide the additional power required by a wireless card, but for a reasonable capacity, the size of the battery can easily be larger than the size of the wireless card, defeating the purpose of having a smaller CF form factor.

Accordingly, there is a need to provide a system and method for maintaining a battery and sharing the stored charge with the supply from the CF card power interface in order to provide power for a wireless card.

SUMMARY OF THE INVENTION

A power system for a wireless card includes a boost regulator. A battery is connected to the output of the boost regulator via a means to share current, and an optional buck regulator is electrically connected to the shared boost regulator/battery configuration. The boost regulator charges the battery and provides a first power source. The battery provides a second power source that is summed with the first power source. Moreover, the buck regulator provides an output voltage below a predetermined voltage.

Preferably, a battery switch, e.g., a field effect transistor switch, is installed between the battery and the boost regulator. Further, a controller is connected to the boost regulator, the buck regulator and the battery switch. The power supply input to the wireless card may be connected to a power amplifier and multiple low drop out voltage regulators supplying various circuits of the wireless card. The first power source and the second power source can be summed within the buck regulator or before the buck regulator, before feeding the power supply input to the wireless card.

In another aspect of the present invention, a power system for a wireless card includes a power interface and a battery connected parallel to the power interface. The system includes a wireless card that is powered by the power interface and the battery. Additionally, the system includes a compact flash card interface that is powered by the power interface only.

In yet another aspect of the present invention, a method for providing power to a compact flash wireless card includes receiving power from a power interface and receiving power from a battery. The power from the power interface and the power from the battery are summed to yield a summed power source. The wireless card is powered using the summed power source and the compact flash card interface is powered using power from the power interface only.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENT

Figure 1:
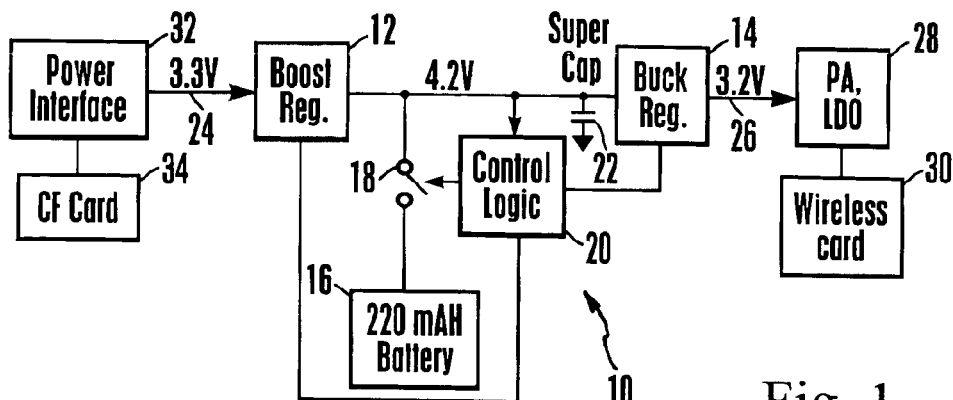
FIG. 1 is a block diagram of a power system for a wireless card.

Referring initially to FIG. 1, a power system for a wireless card is shown and is generally designated 10. As shown, the system 10 includes a boost regulator 12 that is electrically connected to a buck regulator 14. A battery 16, e.g., a 220 mAH battery, is electrically connected to the boost regulator 12 between the boost regulator 12 and the buck regulator 14. As shown a battery switch 18, e.g., a field effect transistor (FET) switch, can be installed between the boost regulator 12 and the battery 16. Moreover, the system 10 includes a controller 20 that communicates with the boost regulator 12, the buck regulator 14 and the battery switch 18. FIG. 1 further shows a capacitor 22, e.g., a super capacitor having a relatively large storage capacity, that can be installed in the system before the buck regulator 14.

As shown, the system 10 has an input 24 that is connected to the boost regulator 12. Also, the system 10 has an output 26 that is connected to the buck regulator 14. Further, wireless circuitry 28 providing power to a wireless card 30 is connected to the output 26 of the system 10. It is to be understood that the wireless circuitry 28 can include, e.g., a power amplifier and/or one or more low drop out voltage regulators (LDO). Moreover, it is to be understood that typically the wireless circuitry 28 is incorporated into the wireless card 30. FIG. 1 also shows that a CF power interface 32 can be connected to the system input 24. The CF power interface 32 can also be connected to a CF card 34.

During operation, 3.3 volts are input to the boost regulator 12 from the power interface 32. Preferably, the boost regulator 12 is designed to limit the current to 500 mA and boost the voltage to 4.2 volts. The buck regulator 14 limits the voltage and outputs 3.2 volts to the wireless circuitry 28. The controller 20 includes control logic that can, for example, control the sharing of the charge between the boost 12 and battery 16, e.g., by opening and closing the switch 18.

Figure 2:
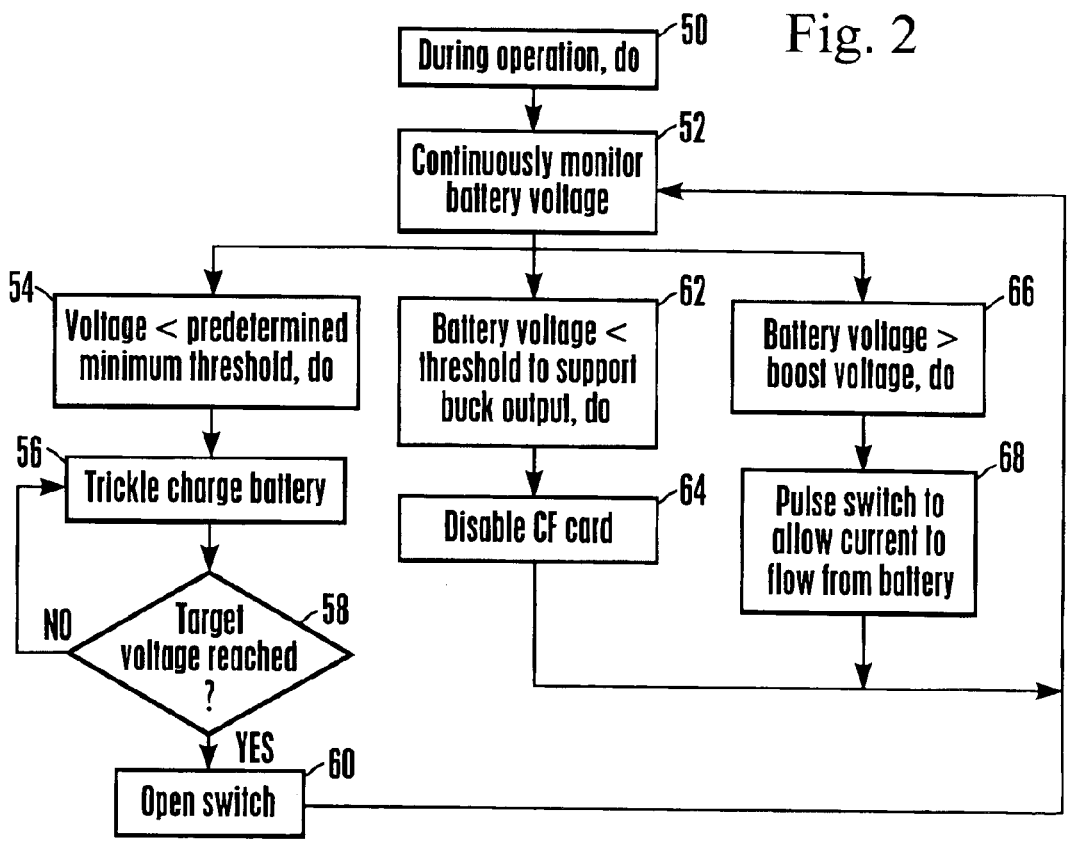
FIG. 2 is a flow chart of the operating logic according to the present invention.

Referring to FIG. 2, the control logic which resides in the controller 20 is shown and commences at block 50 with a do loop wherein during operation the following steps are performed. At block 52, the battery voltage is continuously monitored. Based on the battery voltage, one of three do loops can be performed.

First, beginning at block 54 when the voltage drops below a predetermined minimum threshold, the logic moves to block 56 where the battery 16 is trickle charged. At decision diamond 58, it is determined whether a target voltage, e.g., 4.2 volts, is reached. If that target is not reached, the logic returns to block 56 and the trickle charging continues. If the target voltage is reached, the logic moves to block 60 where the switch 18 is opened in order to prevent "floating" of the battery 16, which can decrease the life of the battery 16. Thereafter, the logic returns to block 52 and the battery voltage continues to be monitored.

The second do loop that can be entered from block 52, commences at block 62 wherein when the battery voltage drops below a threshold to support the buck regulator output voltage, e.g., 3.2 volts, the logic moves to block 64 and the CF card 34 is disabled. Thereafter, logic then returns to block 52 and the battery voltage continues to be monitored.

Proceeding to block 66, the third do loop that can be entered from block 52 commences at block 66. At block 66, when the battery voltage is greater than the boost voltage, the logic moves to block 68 and the switch 18 is pulsed to allow current to flow from the battery 16. It can be appreciated that the buck regulator 14 at the output of the system 10 provides a minimum voltage required by the CF card 30, which maximizes efficiency and helps smooth transients. As an example, with a typical buck regulator efficiency of 90%, a 4.2 to 3.2 voltage conversion reduces the peak current over the boost regulator 14 and battery 16 by nearly 20%. It also happens that power amplifiers used for CDMA also tend to draw less current at lower voltages further trimming the peak current requirement.

Figure 3:
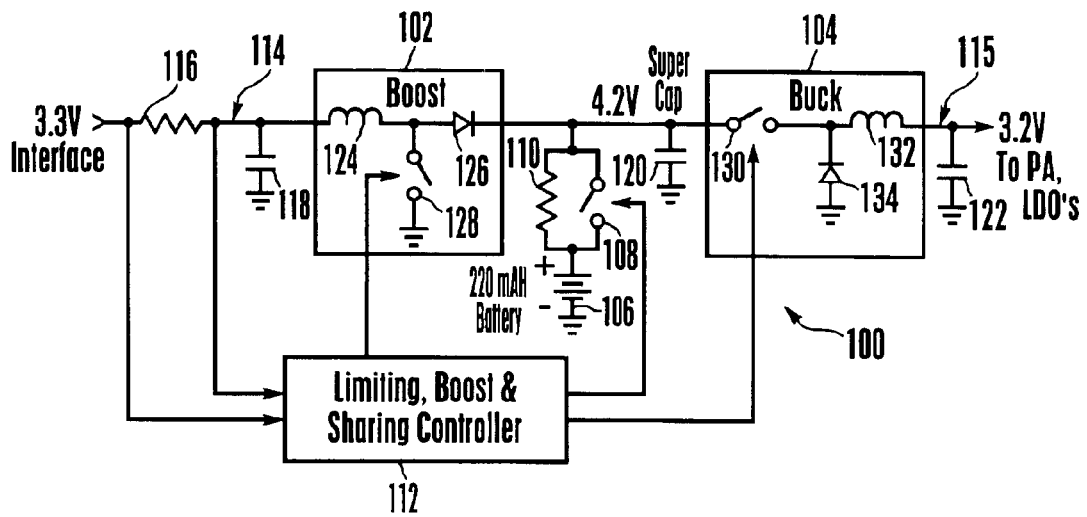
FIG. 3 is a schematic diagram showing a circuit for a power system for a wireless card.

Referring now to FIG. 3, a power circuit for a wireless card is shown and is generally designated 100. As shown, the power circuit 100 includes a boost regulator 102 connected to a buck regulator 104. A battery 106, e.g., a 220 mAH battery, is connected to the circuit 100 between the boost regulator 102 and the buck regulator 104. A battery switch 108, e.g., a FET switch, and a first resistor 110 are connected in parallel between the battery 106 and the circuit 100. A controller 112 is connected to the boost regulator 102, the buck regulator 104 and the battery switch 108.

As shown, an input 114 is connected to the boost regulator 102 and an output 116 is connected to the buck regulator 104. Moreover, a second resistor 116 is installed along the input 114 before the boost regulator 102. The controller 112 senses the voltage across the second resistor 116 and uses it to limit the current in the circuit 100. FIG. 3 shows a first capacitor 118 installed in the circuit 100 before the boost regulator 102. A second capacitor 120, e.g., a super capacitor with a relatively large storage capacity, is installed before the buck regulator 104 between the battery 106 and the buck regulator 104. Further, a third capacitor 122 is installed in the circuit 100 after the buck regulator 104.

FIG. 3 shows that the boost regulator 102 includes an inductor 124 connected to the input 114. To prevent reverse current, a diode 126 is connected to the inductor 124 between the inductor 124 and the buck regulator 104. Further, within the boost regulator 102, one pole of a boost switch 128 is connected between the inductor 124 and the diode 126. The other pole of the boost switch 128 is connected to ground. The boost switch 128 is connected to and controlled by the controller 112.

Still referring to FIG. 3, the buck regulator 104 includes a buck switch 130 at the input of the buck regulator 104 to control the flow of electricity into the buck regulator 104. The buck switch 130 is connected to and controlled by the controller 112. An inductor 132 is installed in the buck regulator 104 at its output. A diode 134 is connected to the buck regulator 104 between the buck switch 130 and the inductor 132. Specifically, the anode of the diode 134 is connected to ground and the cathode of the diode is connected to the buck regulator 104 between the buck switch 130 and the inductor 132.

It is to be understood that the logic described above in conjunction with FIG. 2 can be stored in the controller 112 of the circuit 100 shown in FIG. 3. Accordingly, the controller 112 can utilize that logic to control the charging of the battery, control a CF card connected to the circuit 100 and control the discharge of the battery 106. Moreover, the controller 112 can control the boost regulator 102 and the buck regulator 104 by controlling the operation of the boost switch 128 and the buck switch 130.

Figure 4:
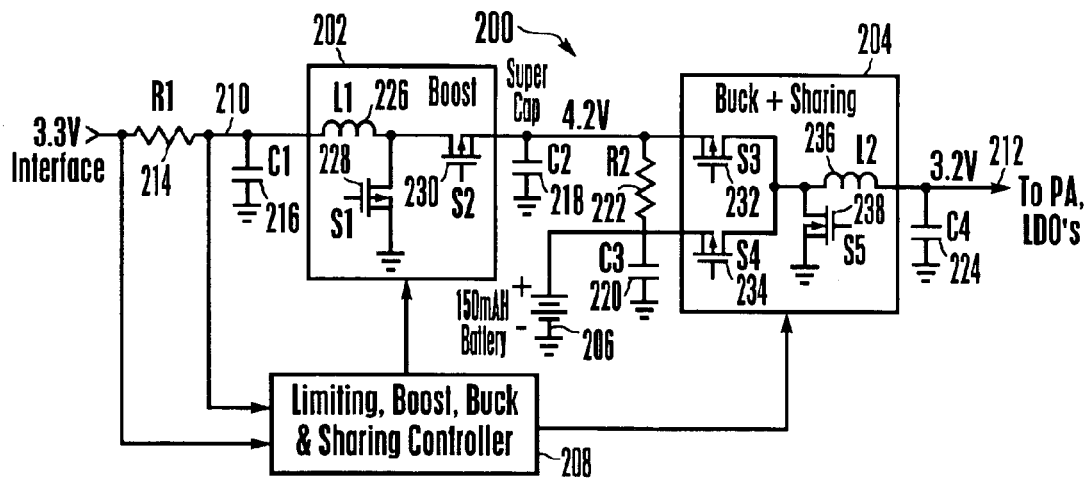
FIG. 4 is a schematic diagram showing a second circuit for a power system for a wireless card.

FIG. 4 shows an alternative embodiment of a power circuit for a wireless card, generally designated 200. As shown, the power circuit 200 includes a boost regulator 202 connected to a buck and sharing regulator 204. A battery 206, e.g., a 150 mAH battery, is connected to the buck and sharing regulator 204 parallel to the boost regulator 202. A controller 208 is connected to the boost regulator 202 and the buck and sharing regulator 204.

As shown, a circuit input 210 is connected to the boost regulator 202 and a circuit output 212 extends from the buck and sharing regulator 204. FIG. 4 shows a first resistor 214 that can be installed along the input 210 before the boost regulator 202. Preferably, the controller 208 can be connected to the input 210 before and after the first resistor 214. As such, the controller 208 can sense the voltage across the first resistor 214 and use it to limit the current in the circuit 200.

FIG. 4 further shows a first capacitor 216 installed in the circuit 200 before the boost regulator 202. A second capacitor 218, e.g., a super capacitor with a relatively large capacitance, is installed between the boost regulator 202 and the buck and sharing regulator 204. It is to be understood that the second capacitor 218 helps reduce ripple from the boost regulator 202 and it acts as a charge reservoir in order to provide instantaneous currents to curb the magnitude of the current spikes. Moreover, the second capacitor 218 can act as an integrator for the boost regulator 202 in order to improve efficiency in low current conditions. This can extend standby time for a wireless device, e.g., a CF card, connected to the circuit 200. For example, with a standby current of 2 mA and a fully charged battery 206, 2 mA is the only boost required current. If the voltage of the second capacitor 218 varies from 4.2 volts to 3.4 volts and the capacitance is 1 mF, then the change in charge is 0.8 milli-Coulombs. This amount of charge can source 2 mA for 0.4 seconds. The boost regulator 202 can re-supply this charge in 8 mA using 100 mA and operate in a 1/50 cycle mode. Accordingly, the efficiency of the boost regulator 202 is greater when it is enabled.

As shown in FIG. 4, a third capacitor 220 can be installed in the circuit 200 between the battery 206 and the buck and sharing regulator 204. A second resistor 222 can be installed in the circuit 200 between the second capacitor 218 and the third capacitor 220. Further, as shown in FIG. 4, a fourth capacitor 224 is connected after the buck and sharing regulator 204 in the circuit output 212.

Still referring to FIG. 4, it is shown that the boost regulator 202 includes an inductor 226 that is connected to the circuit input 210. A first switch 228 is connected after the inductor 226. Specifically, one pole of the first switch 228 is connected after the inductor 226 and the other pole of the first switch 228 is connected to ground. The first switch 228 can be used to control the operation of the boost regulator 202. To prevent reverse current, a second switch 230 can be installed in the boost regulator 202 after the first switch 228.

As further shown in FIG. 4, the buck and sharing regulator 204 includes a third switch 232 that can be opened and closed to control the power supply from the boost regulator 202. Moreover, a fourth switch 234 is installed in the buck and sharing regulator 204 parallel the third switch 232. The fourth switch 234 controls the power supply from the battery 206.

In a preferred embodiment, a second inductor 236 is installed in series with the third switch 232 and the fourth switch 234 within the buck and sharing regulator 232. To control the operation of the buck and sharing regulator 204, a fifth switch 238 can be installed between the third and fourth switches 232, 234 and the second inductor 236. Specifically, one pole of the fifth switch 238 is connected to the buck and sharing regulator 204 and the other pole of the fifth switch 238 is connected to ground.

It can be appreciated that the configuration of the third and fourth switches 232, 234 reduces the current and voltage drop across the third switch 232, which improves efficiency. Also, this configuration eliminates the need for a relatively large FET switch to bypass the buck regulator 204. Further the second inductor 236, i.e., the buck inductor, can have a lower inductance than that of the second inductor 132 shown in FIG. 3. This reduces the equivalent series resistance and the voltage drop across the buck regulator 204. The second inductor 236 can be smaller because the buck regulator 204 normally operates up to approximately 440 mA. Once the current increases beyond 440 mA, the output of the boost regulator 202 begins to sag due to the limiting of the input current, and there is a small window beyond 440 mA where the buck regulator 204 has a reduced input voltage. Beyond that window, when the buck regulator 204 begins to drop out, the battery 206 is "bucked in" to keep the input voltage just high enough to maintain 3.2 volts at the output 212. As such, the fifth switch 238 is rarely closed. Since that battery voltage is closer to the boost regulator voltage than the boost regulator voltage is to the 0 volt ground potential across the fifth switch 238, the fourth switch 234 is essentially bucking in more current and the spikes across the second inductor 236 are reduced. The battery 206 can buck in 410 mA to combine with the 440 mA bucked in from the buck regulator 204 to provide 850 mA.

Further, if the battery 206 is significantly charged, current can flow through the second resistor 222, a charging resistor, and begin to sum into the current from the boost regulator 202 before the boost voltage sags significantly. In such a case, the boost regulator 204 can "ping-pong" between the third and fourth switches 232, 234 to maintain the boost voltage and the battery voltage about equal, so that the current flows through the more efficient path of the fourth switch 234 from the battery 206. Moreover, the buck regulator 204 can operate the fifth switch 236 to buck the voltage down to 3.2 volts. If the ripple due to this action becomes too high, the buck output voltage can be allowed to rise above 3.2 volts. This can occur when a PA connected to the output 212 is drawing maximum current and the PA can benefit from a higher voltage and less ripple. The maximum voltage from the boost regulator 202 and the battery 206 sharing is approximately 3.8 volts which is below the operating voltage of a typical PA, i.e., 4.2 volts for direct battery operation.

It happens that some bucking can occur to improve efficiency if the ripple is acceptable, but the ripple will likely be small since the buck is switching between two nearly equivalent voltages across the third and fourth switches 232, 234. It is possible with a more complex controller that the second resistor 222, i.e., the charging resistor, can be eliminated and the battery can be charged by tapping off of the buck regulator 204 in a pulsed mode through the fourth switch 234.

It is to be understood that the logic described above in conjunction with FIG. 2 can be stored in the controller 208 of the circuit 200 shown in FIG. 4. Accordingly, the controller 208 can utilize that logic to control the charging of the battery, control a CF card connected to the circuit 200 and control the discharge of the battery 206. Moreover, the controller 208 can control the boost regulator 202 and the buck regulator 204 by controlling the operation of the switches 228, 230, 232, 234, 236.

While the particular SYSTEM AND METHOD FOR REDUCING EXTERNAL BATTERY CAPACITY REQUIREMENT FOR A WIRELESS CARD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A power system, comprising:
   a boost regulator;
   a battery electrically connected to the boost regulator;
   wherein the boost regulator charges the battery;
   wherein the boost regulator provides a first power source; and
   wherein the battery provides a second power source that is summed with the first power source.

2. The system of claim 1, further comprising:
   a buck regulator electrically connected to the boost regulator and the battery; and
   wherein the buck regulator provides an output voltage below a predetermined voltage.

3. The system of claim 2, further comprising:
   a battery switch installed between the battery and the boost regulator.

4. The system of claim 3, wherein the switch comprises a field effect transistor switch.

5. The system of claim 3, further comprising:
   a controller connected to at least one of: the boost regulator, the buck regulator and the battery switch.

6. The system of claim 1, further comprising:

wireless circuitry connected to the boost regulator and the battery; and wherein the wireless circuitry receives power from the boost regulator and the battery.

7. The system of claim 6, wherein the wireless circuitry includes:

a power amplifier.

8. The system of claim 7, wherein the wireless circuitry further includes:

at least one low drop out voltage regulator.

9. The system of claim 2, wherein the first power source and the second power source are summed within the buck regulator.

10. The system of claim 2, wherein the first power source and the second power source are summed before the buck regulator.

11. A power system for a wireless card, comprising:

a power interface;

a battery connected parallel to the power interface;

a wireless card, the wireless card being powered by the power interface and the battery; and a compact flash card, the compact flash card being powered by the power interface only.

12. The system of claim 11, further comprising:

a boost regulator electrically connected to the power interface, the boost regulator increasing a voltage supplied by the power interface.

13. The system of claim 12, further comprising:

a buck regulator electrically connected to the boost regulator and the battery, the buck regulator providing power to the wireless card and maintaining an output voltage below a predetermined threshold.

14. The system of claim 13, further comprising:

a capacitor electrically connected between the boost regulator and the buck regulator.

15. A method for providing power to a wireless card and a compact flash card, comprising:

receiving power from a power interface;

receiving power from a battery;

summing the power from the power interface and the battery to yield a summed power source;

powering the wireless card using the summed power source; and powering the compact flash card using the power from the power interface.

16. The method of claim 15, further comprising:

boosting the power from the power interface to yield a boosted power source.

17. The method of claim 15, further comprising:

regulating the summed power below a predetermined threshold.

18. The method of claim 15, further comprising:

monitoring the voltage of the battery.

19. The method of claim 18, further comprising:

when the voltage of the battery falls below a predetermined minimum threshold, trickle charging the battery at least partially using the boosted power until a target voltage is reached.

20. The method of claim 19, further comprising:

when the target voltage is reached in the battery, opening a switch connected to the battery to disrupt the flow of power to the battery.

21. The method of claim 18, further comprising:

when the voltage of the battery falls below a predetermined minimum threshold, disabling the compact flash card.

22. The method of claim 18, further comprising:

when the voltage of the battery is greater than the boosted voltage, pulsing a switch connected to the battery to allow the battery to discharge.

* * * * *